INVENTORS.
GEORGE VASU
KIRBY W. HILLER
BY
ATTORNEYS

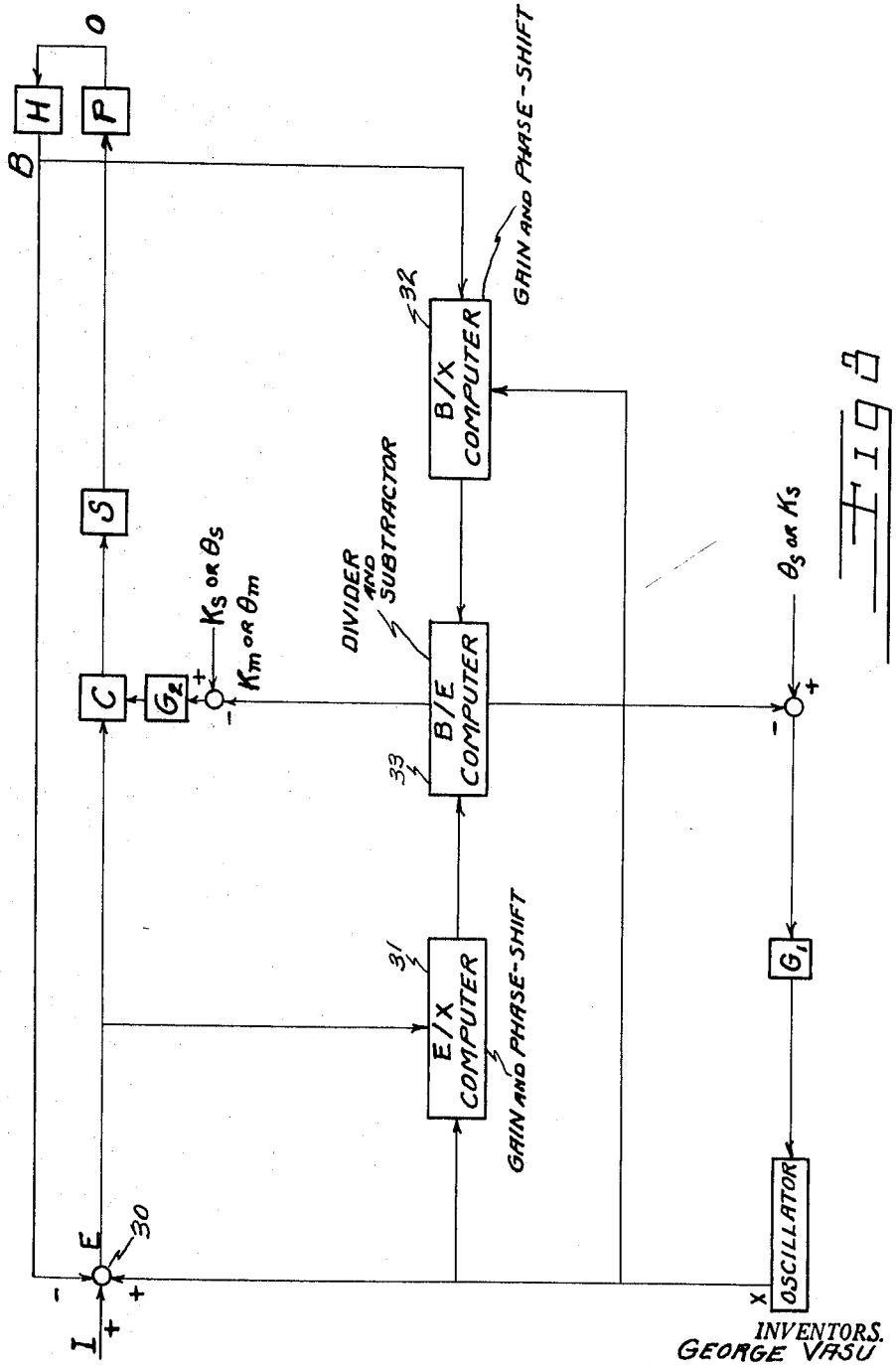

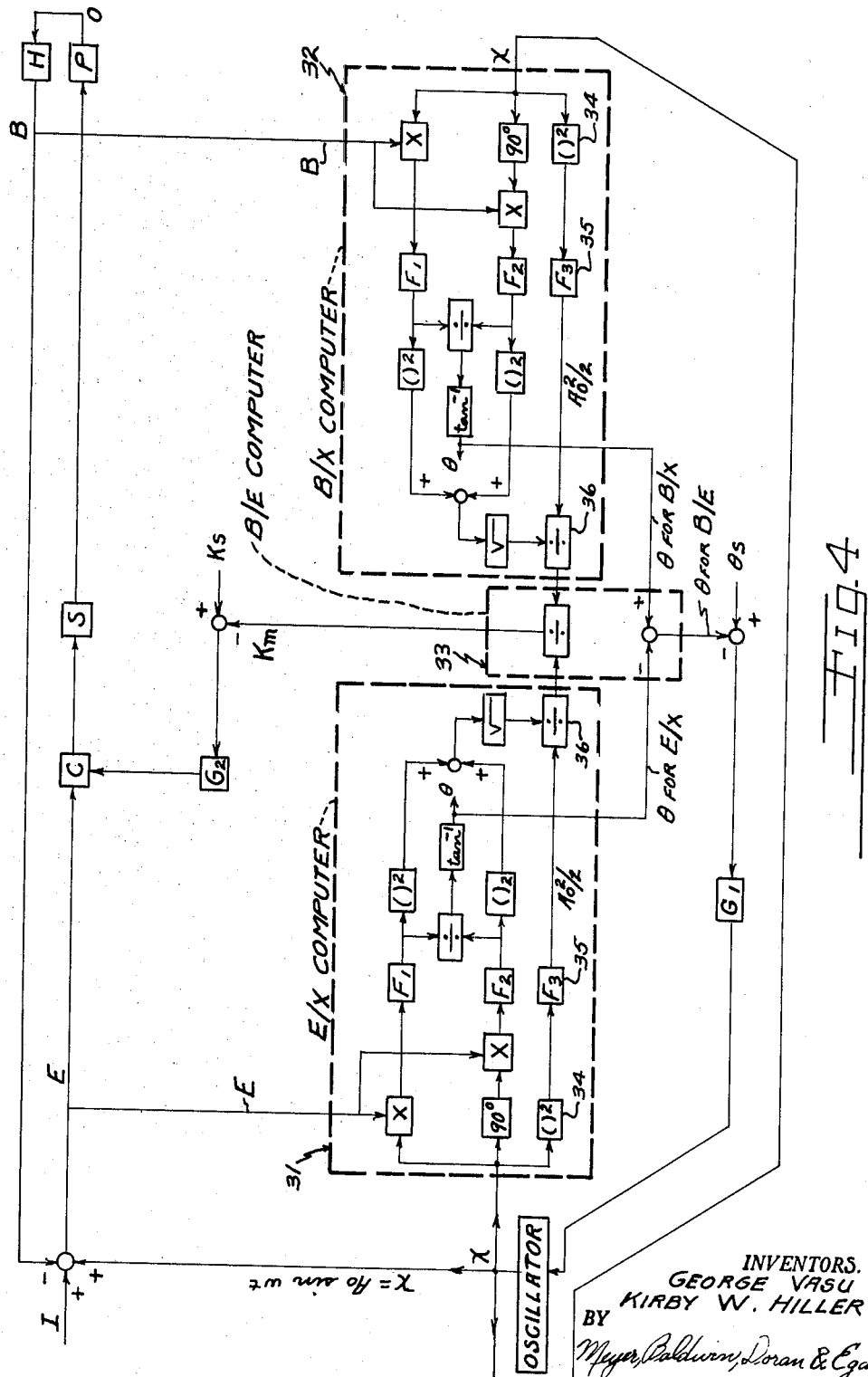

United States Patent Office 3,250,897
Patented May 10, 1966

3,250,897
SELF-ADAPTIVE SYSTEMS FOR AUTOMATIC CONTROL OF DYNAMIC PERFORMANCE BY CONTROLLING GAIN AND PHASE MARGIN
George Vasu, 37825 Lorie Blvd., Avon, Ohio, and Kirby W. Hiller, 494 Woodmere Road, Berea, Ohio
Filed Oct. 5, 1961, Ser. No. 143,118
4 Claims. (Cl. 235—151)

This invention relates to systems and control thereof, and more particularly to automatic control of the dynamic performance of said systems by controlling the gain and phase margin of said system to thereby make said systems self-adaptive.

A classical method of designing control systems is to design a controller so that the overall system will have some specified gain and/or phase margin. Gain and phase margin are thus criteria commonly used to determine whether a system has been properly designed.

In designing a controller, the type of control function that it is intended to perform must be determined; that is, it must be determined whether the control should provide proportional, integral, derivative, or more complex operations and whether nonlinear operations should also be included. In addition to specifying the form of the control, it is also necessary to specify the adjustments of the constants (gain, time constants, etc.) in the type of controller selected. Once the form of the controller is fixed, these constants then are adjusted to provide the proper gain and phase margin.

Ordinarily, an effort is made to maintain reasonably constant gain and phase margin. This is accomplished in some systems merely by providing fixed controller settings. In other systems, however, controller settings must be varied as functions of many parameters in an attempt to achieve suitable gain and phase margins and hence good performance. It is expensive and time consuming to search for methods of scheduling controller settings, and even then the desired system performance may not be obtained over all operating ranges and conditions.

In our copending applications, entitled, Amplitude Ratio Computer and Control System, Serial No. 141,224, filed September 27, 1961; Phase-Shift Computer and Control System, Serial No. 141,221, filed on September 27, 1961; and Multiplier-Type Gain Computer and Control System, Serial No. 143,120, filed October 5, 1961; systems have been described that will automatically control gain and phase shift during actual operation even in closed-loop systems. The availability of such gain and phase-shift controls makes it possible to obtain automatic control of system performance under varying conditions by another control method.

There are proposed herein therefore systems that will maintain a given gain and/or phase margin under widely varying and even unpredictable operating conditions. Since gain and phase margin are control performance criteria, these systems may be used to automatically measure the quality of control performance, compare such performance with desired values to obtain a performance error signal, and then provide the proper control action to eliminate or minimize the error in performance.

It is therefore a primary object of the present invention to provide self-adaptive systems in which a given gain and/or phase margin of the said system will be maintained under widely varying conditions.

Another object of the present invention is to provide self-adaptive systems in which parameters indicating the quality of performance may be automatically measured and compared with preselected parameters to obtain a system performance error signal, and which then provides for controlling the functioning of said system effective to eliminate or minimize said performance error.

Other objects and advantages of the self-adaptive systems of the present invention may be hereinafter apparent to one skilled in the art to which it pertains upon reference to the following disclosure of several preferred embodiments and which are illustrated in the accompanying drawings; wherein FIG. 1 is a self-adaptive system embodying the present invention in which gain-margin control of said system is effected;

FIG. 3 is a third embodiment of self-adaptive system in which gain or phase margin control of the system may be accomplished by multiple computation; and, FIG. 4 is the system of FIG. 3 with the computers shown in detail.

*List of symbols*

A, B—constants
C—control
E—error
F—filter
G—general system component
H—feedback component
I—input
K—gain
O—output
P—plant
S—servo
s—Laplacian operator
t—time
x—general signal
$x(s)$—Laplace transformer of $x(t)$
$x(t)$—general time function
θ—phase angle
ω—frequency Subscripts:

k—gain
    m—measured value
    s—set value
    θ—phase angle

The above list of symbols identify the components, operational characteristics and the relationship therebetween of the systems of the present invention now to be described.

*Gain-margin control*

Figure 1:
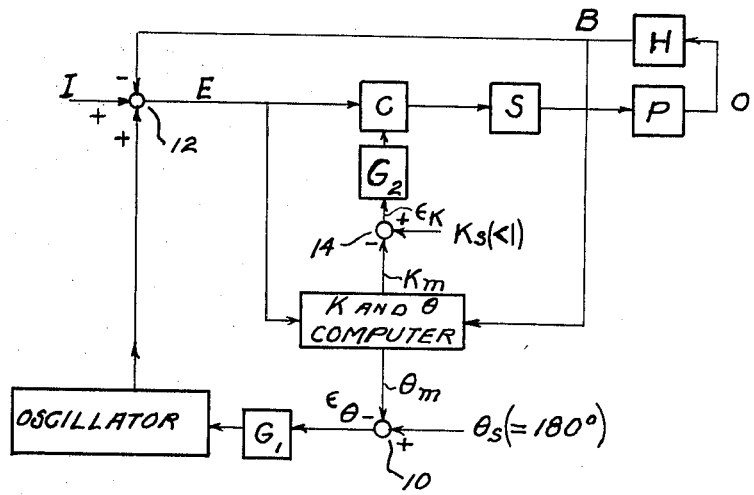

With reference now directed to the drawings, a proposed system for controlling gain margin of a system is illustrated in FIG. 1. Assume that a closed-loop system consisting of a control C, a servo S, a plant or process P, a feedback unit H, and a combination comparing device and adder 12 is given. Unit 12 receives the system input signal I together with the feedback signal from the feedback unit H and the output of the oscillator or function generator. As such a system operates over a range of conditions, it will be the function of the gain-margin control to maintain proper system performance.

Gain margin of a system can be defined as the factor by which the gain can be increased before the system becomes unstable. This margin can be determined by measuring the gain around the system loop at the frequency for which the loop phase shift is 360°. The factor by which this measured gain can be increased without exceeding unity is the gain margin. Thus, the function of one part of the system illustrated in FIG. 1 is to control the oscillator frequency so that it always functions at that frequency for which the loop phase shift is 360°. The function of the gain measuring part of the system is then to measure the gain for that frequency.

For a negative feedback system as indicated in FIG. 1, the phase shift in the comparator 12 is 180°. Therefore, a total loop phase shift of 360° will occur when the phase shift in the rest of the loop (E to B) is also 180°. The gain of the comparator 12 is assumed to be unity. As a result, a measure of loop gain and loop phase shift can be obtained by computing the gain and phase shift from E to B as shown. To measure the gain and phase shift computer are used and which may be one of several types disclosed in my Conference Paper entitled, "Self-Adaptive Systems for Automatic Control of Dynamic Performance by Controlling Gain, Phase Shift, Gain Margin, Phase Margin, or Slope," which was presented to the Fall Meeting of the American Institute of Electrical Engineers, October 9–14, 1960, and to which reference is herein directed for a detailed description and operation analysis of said computer systems.

To measure the phase-shift of the closed-loop system of FIG. 1, the error signal E and the feedback signal B are sensed by the phase-shift computer, which provides a signal output $\theta_m$ representing the phase shift from E to B.

The output $\theta_m$ of the phase-shift computer is compared in comparator 10 with a reference signal $\theta_s$ whose value corresponds to a phase shift of 180°.

The output of the comparator 10 furnishes an error signal $\epsilon_\theta$ that actuates a controller $G_1$ causing it to increase or decrease the oscillator frequency as necessary to provide that freqeuncy for which the phase shift from E to B is 180°. The oscillator thus continually disturbs or "tests" the system at the proper frequency.

In the same manner, the loop gain between E and B is measured such that the gain computer provides an output signal $K_m$ which is representative of the gain.

Since the gain-measuring computer selects the same signals (E and B) that were selected by the phase-measuring computer, its output $K_m$ is the gain at the frequency for which the measured phase shift is 180°. The measured gain $K_m$ is then compared at comparator 14 with a signal of fixed value $K_s$ that is selected to provide the proper gain margin between points E and B. An error signal $\epsilon_k$ is thus generated which actuates a gain controller $G_2$ whose output corrects the gain of the main controller C in the direction to give the desired gain margin for the system. The result is an overall system whose dynamic performance is automatically being controlled by controlling gain margin.

For proper operation without additional complications, the variations of gain and phase shift with frequency should be monotonic. In many cases these functions will be monotonic throughout the complete range of frequencies, and in most cases the functions will be monotonic at least in the range where gain and phase margin are of interest.

In special cases system variations may be of such a nature that gain and phase shift can be related. In these cases, it may be preferable to compute only gain or only phase shift and obtain the second parameter from the functional relation that will be known to exist between gain and phase shift.

*Phase-margin control*

Figure 2:
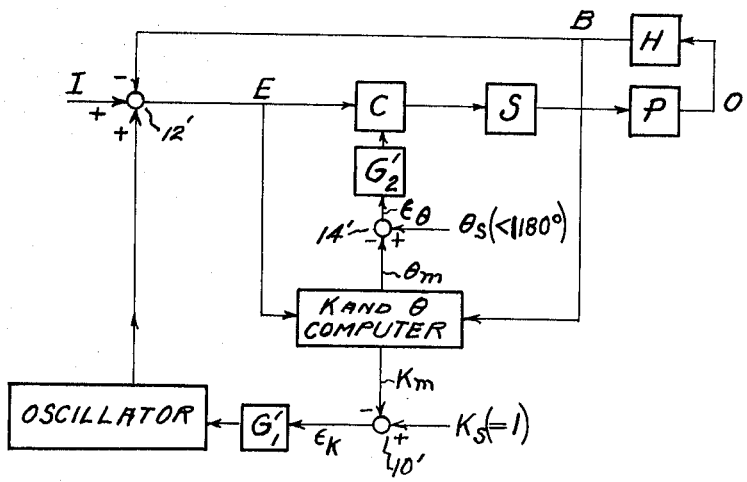
FIG. 2 is a second embodiment of self-adaptive system in which phase-margin control of said system is accomplished.

Phase margin can be defined as the amount by which the phase shift can be increased before a system becomes unstable. An indication of phase margin can be obtained by measuring the phase shift of loop components C, S, P, and H of the closed loop system as is shown in FIG. 2 at that frequency for which the gain of these same components is unity. The amount by which this measured phase shift can be increased without exceeding 180° is the phase margin.

By reversing the roles of the gain and phase-measuring computer components of FIG. 1, to that as is shown in FIG. 2 phase-margin control of the system can be achieved. The loop gain and phase-shift between E and B are measured in the gain and phase shift computers in the same manner as in the previous system. In this system the measured gain $K_m$ is compared at comparator 10' to a set value of unity gain ($K_s=1$) to provide an error signal $\epsilon_k$. This error signal $\epsilon_k$ actuates a controller $G_1$, which varies the frequency of the oscillator in such a fashion that the gain of the system at the oscillator frequency will always be unity.

The phase-shift computer then provides a phase signal $\theta_m$, which is compared at comparator 14' with the desired phase signal having a phase value $\theta_s$ set for the proper phase margin. The difference between signals $\theta_s$ and $\theta_m$ is an error signal $\epsilon_\theta$ suitable to actuate a phase-shift controller $G_2$ which, in turn, regulates the main controller C to increase or decrease the phase margin of the system as desired. The result in this case is an overall system whose dynamic performance is being controlled by maintaining a given phase margin.

If desired, both gain and phase margin could be controlled simultaneously.

A requirement of the system just described is that the oscillation frequency vary. It is noted in the simple systems of FIGS. 1 and 2 that the E and B signals may both be multiple frequency signals. As shown in the Conference Paper a multiplier type gain and phase shift computer can operate properly if one signal is noisy provided the other signal is a clear sine wave. Thus for the systems of FIGS. 1 and 2 tuned filters would be required for at least one of the inputs to the K and $\theta$ computer. In some control systems where the frequency excursion is narrow or where the noise level is low this technique would be adequate.

In other control systems where the filtering problem might be critical it can be circumvented by simply using two computers of the K and $\theta$ type. This system is illustrated in FIG. 3 where the same general type of closed loop consisting of blocks C, S, P, and H is shown. Each of the gain and phase shift computers takes one clear sinusoidal reference signal from the oscillator. The left hand computer then calculates the gain and phase shift of the E signal while the right hand computer calculates the gain and phase shift of the B signal. The middle computer then performs a simple division to get loop gain and a simple subtraction to get loop phase shift. The overall operation of the system of FIG. 3 is similar to that described previously except that two of the multiplier type gain and phase shift computers 31 and 32 are used. FIG. 3 is labled such that it applies to either gain or phase margin control.

The advantage of using several computers instead of only one is that variable frequency signals can more easily be accommodated, the computers can be simplified versions, and more flexible and improved performance can be achieved.

The gain and phase shift computers could be of various types. Various types and modifications of types are discussed in the AIEE Conference Paper previously mentioned. Of the various types, a preferred combination has been selected and illustrated in FIG. 4. In FIG. 4, the $E/x$ and $B/x$ computers each consist of an amplitude ratio and a phase shift computer of the multiplier type. These specific computers are the subject matter of the above referred to copending applications and therefore are not explained in detail herein. Said computers are illustrated to show the part they play in obtaining gain margin control.

Also discussed in the Conference Paper are methods of simplifying the computers further to eliminate components. From that discussion it will be evident to those skilled in the art that if desired, certain of the components shown in the complete computers of FIG. 4 can be eliminated. In particular the division circuits can generally be eliminated in favor of simpler circuitry. Also if the oscillator is designed to produce a known signal amplitude, the squarer 34, filter 35, and divider 36 which correct for amplitude variations can be eliminated in each amplitude ratio computer. In general, the two amplitude ratio and phase shift computers 31 and 32 can be identical.

What is claimed is:

1. In a control system, means for maintaining the gain margin of said system wherein the gain margin represents a significant control performance criterion, means for measuring the loop gain of said system at the frequency for which the loop phase-shift is 360°, means for comparing the measured gain of said system with a fixed value to thereby provide a resultant error signal, and means responsive to said error signal for correcting gain of said system effective to control the gain margin of said system, comparator means for comparing the measured phase-shift of said system with a set value which is significant for gain margin control to produce an error signal, means sensitive to the error signal which generates an actuating signal, means for generating a substantially sinusoidal signal which means is sensitive to said actuating signal to produce a signal which has an output frequency which varies as a function of the actuating signal, and means for injecting the output of said generating means into said control system.

2. In a closed-loop control system, means for maintaining the phase margin of said system wherein the phase margin represents a significant control performance criterion, means for measuring the loop phase shift of said system at the frequency for which loop gain is unity, means for comparing the measured phase shift of said system with a fixed value to produce a resultant error signal, means responsive to said error signal for correcting phase shift of said system effective to control the phase-margin of said system, comparator means for comparing the measured gain of said system with a set value of unity which is significant for phase margin control to produce an error signal, means sensitive to the error signal which generates an actuating signal, means for generating a substantially sinusoidal signal which means is sensitive to said actuating signal to produce a signal which has an output frequency which varies as a function of the actuating signal, and means for injecting the output of said generating means into said control system.

3. In a control system, means for maintaining the gain margin of said system wherein the gain margin represents a significant control performance criterion, means for measuring the loop gain of said system at the frequency for which the loop phase-shift is 360°, said measuring means including a first gain computer for measuring gain between a first point and a second point in said system and a second gain computer for measuring gain between said first point and a third point in said system, and a third computer responsive to the outputs of said first and second computers for measuring the gain between said second and third points to give a measure of the loop gain of said system, means for comparing the measured gain of said system with a fixed value to thereby provide a resultant error signal, means responsive to said error signal for correcting gain of said system effective to control the gain margin of said system, said measuring means including a first phase-shift computer for measuring phase shift between said first and second points in said system, and a second phase-shift computer for measuring phase shift between said first point and said third point in said system, and a third computer responsive to the outputs of said first and second computers for measuring the phase shift between said second and third points to give a measure of the loop phase shift of said system, comparator means for comparing the measured phase shift of said system with a set value which is significant for gain margin control to produce an error signal, means sensitive to the error signal which generates an actuating signal, means for generating a substantially sinusoidal signal which means is sensitive to said actuating signal to produce a signal which has an output frequency which varies as a function of the actuating signal, and means for injecting the output of said generating means into said control system.

4. In a control system, means for maintaining the phase margin of said system wherein the phase margin represents a significant control performance criterion, means for measuring the loop phase shift of said system at the frequency for which the loop gain is unity, said measuring means including a first phase shift computer for measuring phase shift between a first point and a second point in said system and a second phase shift computer for measuring phase shift between said first point and a third point in said system, and a third computer responsive to the outputs of said first and second computers for measuring the phase shift between said second and third points to give a measure of the loop phase shift of said system, means for comparing the measured phase shift of said system with a fixed value to thereby provide a resultant error signal, means responsive to said error signal for correcting phase shift of said system effective to control the phase margin of said system, said measuring means including a first gain computer for measuring gain between said first and second points in said system, and a second gain computer for measuring gain between said first point and said third point in said system, and a third computer responsive to the outputs of said first and second computers for measuring the gain between said second and third points to give a measure of the loop gain of said system, comparator means for comparing the measured gain of said system with a set value which is significant for phase margin control to produce an error signal, means sensitive to the error signal which generates an actuating signal, means for generating a substantially sinusoidal signal which means is sensitive to said actuating signal to produce a signal which has an output frequency which varies as a function of the actuating signal, and means for injecting the output of said generating means into said control system.

References Cited by the Examiner

UNITED STATES PATENTS

| | | | |
|---|---|---|---|
| 2,928,035 | 3/1960 | Levinson et al. | 318—448 |
| 2,940,028 | 6/1960 | Pargen | 318—448 X |

OTHER REFERENCES

Publication: Technical Note 3826, USNACA.

MALCOLM A. MORRISON, *Primary Examiner.*

ORIS L. RADER, *Examiner.*